United States Patent
Newman et al.

(10) Patent No.: US 11,126,797 B2
(45) Date of Patent: Sep. 21, 2021

(54) TOXIC VECTOR MAPPING ACROSS LANGUAGES

(71) Applicant: Spectrum Labs, Inc., San Francisco, CA (US)

(72) Inventors: Josh Newman, San Ramon, CA (US); Yacov Salomon, Danville, CA (US); Jonathan Thomas Purnell, Natick, MA (US); Indrajit Haridas, San Francisco, CA (US); Alexander Greene, East Palo Alto, CA (US)

(73) Assignee: Spectrum Labs, Inc., San Francisco, CA (US)

( * ) Notice: Subject to any disclaimer, the term of this patent is extended or adjusted under 35 U.S.C. 154(b) by 35 days.

(21) Appl. No.: 16/460,926

(22) Filed: Jul. 2, 2019

(65) Prior Publication Data

US 2021/0004440 A1  Jan. 7, 2021

(51) Int. Cl.
*G06F 40/30* (2020.01)
*G06F 16/33* (2019.01)
*G06N 7/00* (2006.01)
*G06N 3/08* (2006.01)

(52) U.S. Cl.
CPC .......... *G06F 40/30* (2020.01); *G06F 16/3347* (2019.01); *G06N 3/08* (2013.01); *G06N 7/005* (2013.01)

(58) Field of Classification Search
CPC .......... G06F 40/00; G06F 40/10; G06F 40/20; G06F 40/30; G06F 16/3347; G06N 3/08; G06N 7/005
See application file for complete search history.

(56) References Cited

U.S. PATENT DOCUMENTS

| 9,959,271 | B1 * | 5/2018 | Goyal | G06F 40/51 |
| 2011/0040552 | A1 * | 2/2011 | Van Guilder | G06F 40/18 |
| | | | | 704/4 |
| 2017/0083484 | A1 * | 3/2017 | Patil | G06F 16/686 |
| 2017/0177564 | A1 * | 6/2017 | Rottmann | G06F 40/40 |

(Continued)

FOREIGN PATENT DOCUMENTS

| CN | 108960317 A | * 12/2018 |
| CN | 111104806 A | * 5/2020 |

*Primary Examiner* — Paras D Shah
*Assistant Examiner* — Darioush Agahi
(74) *Attorney, Agent, or Firm* — Holland & Hart LLP

(57) ABSTRACT

Methods, systems, and devices for language mapping are described. Some machine learning models may be trained to support multiple languages. However, word embedding alignments may be too general to accurately capture the meaning of certain words when mapping different languages into a single reference vector space. To improve the accuracy of vector mapping, a system may implement a supervised learning layer to refine the cross-lingual alignment of particular vectors corresponding to a vocabulary of interest (e.g., toxic language). This supervised learning layer may be trained using a dictionary of toxic words or phrases across the different supported languages in order to learn how to weight an initial vector alignment to more accurately map the meanings behind insults, threats, or other toxic words or phrases between languages. The vector output from this weighted mapping can be sent to supervised models, trained on the reference vector space, to determine toxicity scores.

19 Claims, 12 Drawing Sheets

(56) References Cited

U.S. PATENT DOCUMENTS

2017/0235846 A1* 8/2017 Atlas ..................... G06F 16/285
                                                              707/737
2019/0172466 A1* 6/2019 Lee ....................... G06F 40/284
2019/0197119 A1* 6/2019 Zhang .................... G06F 40/58
2019/0332677 A1* 10/2019 Farhan ................. G06F 40/242

* cited by examiner

TOXIC VECTOR MAPPING ACROSS LANGUAGES

FIELD OF TECHNOLOGY

The present disclosure relates generally to automated language processing, and more specifically to toxic vector mapping across languages.

BACKGROUND

Some systems, such as automated language processing systems, may implement natural language processing (NLP) applications to analyze large amounts of natural language data (e.g., thousands or millions of text strings). These systems may identify specific words or phrases from the natural language data, predict meaning from the data, assign values or scores to the data, or perform any combination of these functions. The systems may implement machine learning models that are trained on a large corpus of labeled natural language data, such that the models can learn how to handle a wide variety of words, phrases, and meanings. However, in some cases, a large amount of labeled training data may be difficult to obtain, especially for multiple different languages. As such, applying a machine learning model implementing NLP from one language to another can be difficult to train accurately, resulting in inaccurate, non-robust, language-specific models.

DETAILED DESCRIPTION

Figure 1:
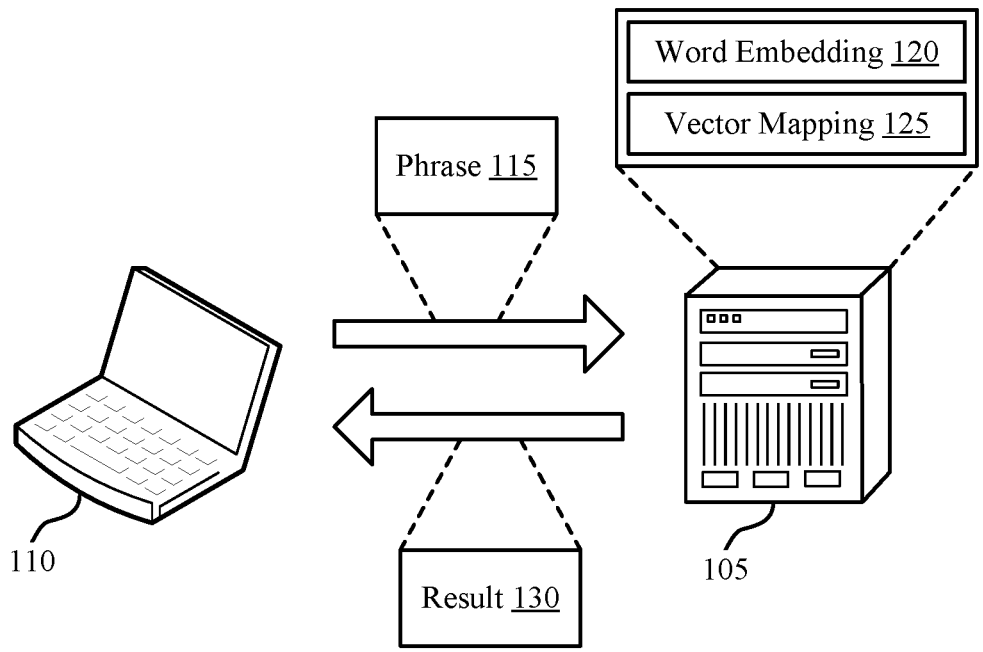
FIG. 1 illustrates an example of a system for language mapping on a server that supports toxic vector mapping across languages in accordance with aspects of the present disclosure.

A machine learning model may implement natural language processing (NLP) to determine meaning from a phrase (e.g., a word, a set of words, a sentence, a set of sentences, etc.). To accurately train the machine learning model, a user may input a large corpus of labeled natural language training data to the model. The model may update weights in a neural network based on the training data, such that the model can accurately handle new inputs not contained in the training data set. In some cases, the machine learning model may support multiple languages. However, a large amount of training data may be difficult to obtain for multiple different languages. As such, applying a model implementing NLP in one language to another language can be difficult to train accurately. For example, typical word embedding alignment may be too general to accurately capture the sentiment or meaning of certain words when attempting to map different languages into a single vector space.

To improve the accuracy of vector mapping across languages supported by a machine learning model, a system may implement a supervised learning layer to refine cross-lingual alignment of particular vectors corresponding to specific words or phrases. This supervised learning layer may be trained using a dictionary of words or phrases across the different supported languages that are associated with a specific function of the model. For example, the model may detect toxic language in a phrase (e.g., in a social media post, a forum comment, etc.), where the dictionary may include a targeted corpus of toxic words or phrases in different languages supported by the machine learning model. Using this dictionary, the new layer may learn how to weight the vector mapping (e.g., after an initial, more general vector alignment) to accurately map the meanings behind insults, threats, or other toxic words or phrases between languages. The vectors output from this weighted mapping can then be sent to a supervised model, trained on the single vector space, to determine a score for the input phrase (e.g., a toxicity score).

For example, a server running the language mapping model may receive a string representing a phrase in a first language (e.g., Spanish). The server may determine a vector representing the string using a word embedding operation for the first language (e.g., a Spanish language-specific word embedder). The server may map this vector to a vector space associated with a reference language (e.g., English) using a matrix, where the matrix may be determined using an unsupervised learning procedure. This initial vector mapping may be a general language mapping procedure that is not focused on any specific meaning behind the input phrase. As such, this initial vector mapping may not accurately capture the sentiment or meaning of certain words in the reference language vector space (e.g., certain toxic words or meanings within the input phrase). To support accurate toxic vector mapping, the server may remap the vector to the reference language vector space based on a set of words translated into both the first language and the reference language for focusing the language mapping. This set of words may be an example of a toxic language dictionary, including words or phrases associated with certain toxic meanings in each supported language (e.g., words or phrases associated with hate speech, harassment, sex trafficking, threats, bullying, self-harm, etc. in both Spanish and English). Using this remapped vector tuned towards toxic speech, the server may determine one or more scores for the input phrase and output a result indicating the one or more scores. In this way, the model used for scoring the phrases may receive a vector as input from a single reference vector space, reducing the training necessary for the scoring functions while improving cross-lingual accuracy due to the targeted vector remapping.

Aspects of the disclosure are initially described in the context of a system supporting language mapping (e.g., on a server). Additional aspects of the disclosure are described with reference to a scoring process, architecture diagrams, and a process flow. Aspects of the disclosure are further illustrated by and described with reference to apparatus diagrams, system diagrams, and flowcharts that relate to toxic vector mapping across languages.

FIG. 1 illustrates an example of a system 100 for language mapping on a server 105 that supports toxic vector mapping across languages in accordance with aspects of the present disclosure. The system 100 may include a server 105 and a user device 110. The server may be an example of an application server, a database server, a server cluster, a user device, a container, a virtual machine, or any combination of these or other devices or systems configured to perform toxic vector mapping across languages. The user device 110 may be an example of a personal electronic device such as a cellular phone, a personal digital assistant, a tablet computer, a laptop computer, a personal computer, a smart device, or any other user device providing an input/output (I/O) interface for a user. As described herein, the server 105 may receive an input (e.g., from the user device 110) and may perform vector mapping across languages to handle machine learning operations for multiple different supported languages. The machine learning operations may include toxic language identification or any other NLP-based processing that deals with a specific vocabulary of interest.

The user device 110 may identify a phrase 115 for processing. This phrase 115 may be an example of a text string written in a specific language. In some cases, the user device 110 (or an underlying server) may host an application that includes toxic language identification support. For example, a web application running in the web browser of the user device 110 may use a tool for toxic language identification. In some cases, the toxic language identification may be provided by another underlying application or service, and the web application may utilize the toxic language identification based on a subscription. The application may send phrases 115 from the application running on the user device 110 (or in a web browser of the user device 110) for toxic language identification. In a first example, the user device 110 may send each phrase 115 input to the application by a user for toxic language processing. In a second example, the user device 110 may send flagged content to the server 105 for toxic language processing. This content may be examples of social media posts, social media comments, forum posts, emails, texts, chat messages, video transcripts, or any other form of user input or automated text. This content may be input in any number of languages supported by the application at the user device 110. For example, a social media web application may transmit phrases 115—input by a user—to the server 105 to determine whether the phrases 110 contain toxic language (e.g., text associated with hate speech, harassment, sex trafficking, threats, bullying, self-harm, or any other form of toxic language).

The server 105 may receive the phrase 115 and analyze the phrase 115 to determine if it includes toxic language (e.g., across a number of supported languages). The server 105 may implement word embedding 120 to generate a vector (e.g., an array of numbers in a particular number of dimensions) based on the phrase 115. This word embedding 120 may be language specific, where the server 105 may include multiple word embedders to support multiple different languages. The server 105 may additionally implement vector mapping 125 to map vectors from different supported languages into a common vector space. For example, using the vector mapping 125, the server 105 may map each vector into the vector space for a reference language. The server 105 may further remap the vectors based on a vocabulary of interest. For example, if the vector mapping supports toxic language identification, the vocabulary of interest may include words or phrases identified as "toxic" or otherwise associated with toxic language. The server 105 may use this vocabulary of interest to tune the vector mapping, such that the vectors are mapped to the reference language vector space in such a way as to improve the accuracy of mapping the words or phrases between languages that are contained in the vocabulary of interest. In some examples, this targeted remapping may reduce the general applicability of the vector mapping 125 while improving vector mapping 125 for a specific purpose (e.g., identifying toxic language in a phrase 115).

The server 105 may use the mapped vector (e.g., following generic mapping and targeted remapping into a reference vector space) to determine an analysis result 130. For example, the server 105 may include one or more scoring functions, which may score the resulting mapped vector according to one or more text classifications. In some cases, the scoring may involve determining a probability that the phrase 115 falls into a particular category for classification. As described herein, the server 105 may support toxic vector mapping and may calculate a toxicity score for the phrase 115 based on the mapped vector. In some cases, the server 105 may transmit this score (e.g., as a result 130) to the user device 110 or another wireless device for display. In other cases, the server 105 may transmit the score to another wireless device, server, or processor for further processing. For example, the server 105 may send the score to a server hosting a web application, and based on the score (e.g., based on the score exceeding a predetermined or dynamic threshold score, such as 0.80), the server may remove the phrase 115 from the web application (e.g., delete a comment determined to be toxic), block a user, flag the phrase 115 as potentially toxic for further analysis by a user, or perform some combination of these or other actions for handling text identified as toxic. In this way, the server 105 may support automated toxic language identification for multiple supported languages, where the scoring functions may be trained from a single reference vector space.

Conventional systems may perform a single, generic language mapping technique for handling multiple languages. However, based on the nuances in different languages, this generic technique may fail to accurately capture the meaning behind certain words or phrases. For example, some toxic phrases may be made up of words that themselves are not toxic, but the combination of the words in the phrase may result in a toxic meaning. As such, a generic language mapping technique may fail to identify the meaning behind such words or phrases. Additionally or alternatively, certain slang words or phrases may be toxic in a first language, but when translated may not have a toxic meaning in the second language.

In contrast, the system 100 may implement targeted vector remapping to focus the cross-lingual alignment on a specific vocabulary of interest. As this vocabulary of interest may be selected specific to the application of the mapped vectors (e.g., identifying toxic language), the meaning behind toxic words or phrases in different languages can be maintained through the vector mapping procedure. Additionally, a user may update the vocabulary of interest and the system may retrain a machine learning model for vector mapping 125, allowing for support for new languages and phrases or words that may be given new toxic meanings. While described with reference to toxic vector mapping across languages, it is to be understood that the targeted vector mapping may support any NLP-based functionality associated with a limited vocabulary of interest.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
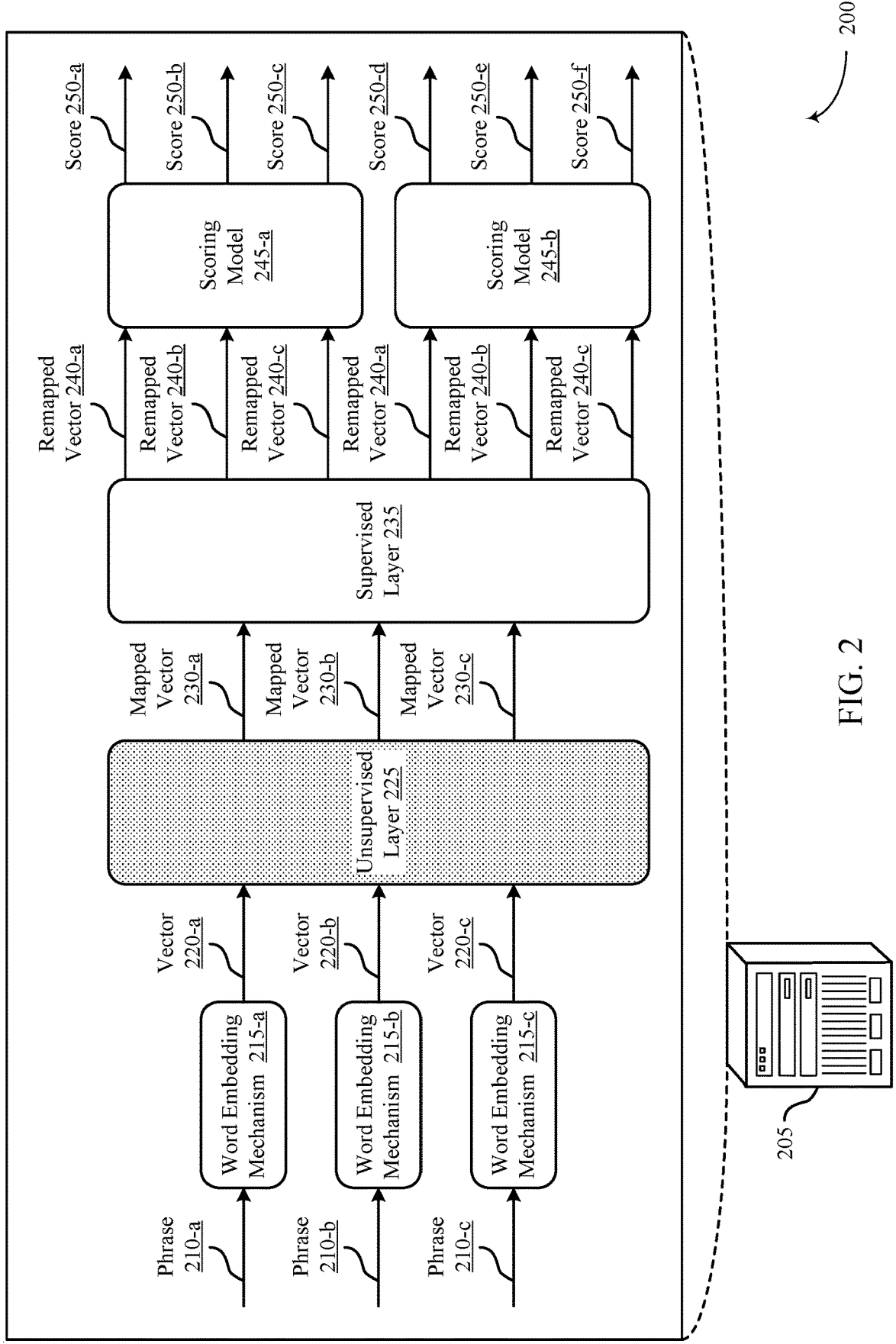
FIG. 2 illustrates an example of a scoring process that supports toxic vector mapping across languages in accordance with aspects of the present disclosure.

FIG. 2 illustrates an example of a scoring process 200 that supports toxic vector mapping across languages in accordance with aspects of the present disclosure. The scoring process 200 may be performed by a server 205, which may be an example of a server 105 as described with reference to FIG. 1. The server 205 may receive a text String (e.g., a word, a phrase, a sentence, etc.) and may process the String to determine one or more scores 250 for the String. These scores 250 may indicate aspects of the String based on a machine learning analysis of the String. The server 205 may output the calculated score(s) 250 for display, storage, or further processing.

The server 205 may receive phrases 210 in different languages for scoring (e.g., toxic language scoring). For example, the server 205 may receive a phrase 210-*a* in a first language, a phrase 210-*b* in a second language, and a phrase 210-*c* in a third language. In some cases, one of these languages may be a reference language for vector mapping. For example, the phrase 210-*b* in the second language may be in the reference language. The server 205 may implement word embedding to transform each phrase into a vector 220 in a vector space. For example, the server 205 may support a number of word embedding mechanisms 215, where each word embedding mechanism 215 determines vectors for a specific language. The word embedding mechanisms 215 may be examples of global vectors for word representation (GloVe) mechanisms or any other types of word embedders. When the server 205 receives a phrase 210, the server 205 may identify the corresponding word embedding mechanism 215 based on the language in which the phrase 210 is written. For example, the word embedding mechanism 215-*a* may receive the phrase 210-*a* in the first language as input and may output the vector 220-*a* in a vector space for the first language. Similarly, a word embedding mechanism 215-*b* may receive the phrase 210-*b* in the second language and determine a vector 220-*b* in the vector space for the second language, and a word embedding mechanism 215-*c* may receive the phrase 210-*c* in the third language and determine a vector 220-*c* in the vector space for the third language.

These vectors 220 mapped to different vector spaces may be mapped to a reference vector space using an unsupervised layer 225. This unsupervised layer 225 may be an example of an unsupervised machine learning model as described with reference to FIG. 3 below. The unsupervised layer 225 may determine a transformation matrix for each language—other than the reference language—to map the vectors for the other languages to the vector space for the reference language. These language-specific matrices may be determined using unsupervised machine learning, such that the training may be performed on large quantities of unlabeled data (e.g., corpora containing millions of words or phrases). In some cases, the unsupervised layer 225 may be an example of one dense layer in the machine learning model. Based on the unsupervised layer 225, the server 205 may map the vectors 220 to mapped vectors 230 in the shared vector space. For example, vector 220-*a* may be transformed to mapped vector 230-*a*, vector 220-*b* may be transformed to mapped vector 230-*b*, and vector 220-*c* may be transformed to mapped vector 230-*c*. In some cases, if vector 220-*b* is already mapped to the shared vector space (e.g., if the second language is the reference language), the server 205 may not modify the vector 220-*b* in the unsupervised layer 225 (or the unsupervised layer 225 may map vector 220-*b* to a mapped vector 230-*b* with the same vector coordinates).

To improve the accuracy of the cross-lingual mapping for specific purposes or terms, the server 205 may send the mapped vectors 230 to a supervised layer 235 for targeted vector mapping. The supervised layer 235 may be an example of a supervised machine learning model as described with reference to FIG. 4 below. This supervised layer 235 may learn to specifically map vectors for a particular dictionary of terms (e.g., labeled terms provided to the server 205), so that these terms in other languages match closely to the corresponding terms in the reference language following vector mapping. As an example, this dictionary of terms (i.e., the vocabulary of interest) may be a large list of Strings (e.g., tens, hundreds, or thousands of words and/or phrases) in each language supported by the server 205. In some cases, different terms in the dictionary of terms may correspond to different weights for vector mapping. These weights may be provided to the supervised layer 235 or determined by the supervised layer 235 such that the vector mapping more heavily weights words important for analysis (e.g., vectors may be weighted towards toxic words to support identifying toxicity in the processed phrases 210). This supervised layer 235 may allow the server 205 to hone the vector mapping in on certain terms of interest to improve vector analysis based on these terms. In some cases, this supervised layer 235 may be an example of a machine learning model, such as a convolutional neural network (CNN), a recursive neural network (RNN), a long short-term memory (LSTM) model, or some combination of these or other machine learning model types.

This supervised layer 235 may allow the server 205 to learn how to explicitly map vectors for a specific vocabulary of toxic language. For example, the initial vector mapping by the unsupervised layer 225 may result in a syntactical and semantic translation. This first layer may output a mapped vector 230 close to the phrase's meaning but missing some subtleties of the original language prior to mapping across languages. However, the refined vector mapping by the supervised layer 235 may hone in on particular vectors or vector coordinates (e.g., associated with toxic language) that allows this second layer to output a remapped vector 240 closer to the same toxicity of the phrase 210 in the original language. Specifically, the vocabulary of interest focuses the cross-lingual mapping by "boosting" the mapping for certain types of words (e.g., toxic words and/or phrases, such as insults, slurs, etc.). In some cases, the mapping performed by the first layer and the second layer may be performed in a joint process or in a different order than described herein. Using the supervised layer 235, the server 205 may remap mapped vector 230-*a* to remapped vector 240-*a*, mapped vector 230-*b* to remapped vector 240-*b*, and mapped vector 230-*c* to remapped vector 240-*c*. In some cases, if mapped vector 230-*b* is based on a phrase 210-*b* in the reference language (e.g., if the second language is the reference language), the server 205 may not modify the mapped vector 230-*b* in the supervised layer 235 (or the supervised layer 235 may remap mapped vector 230-*b* to a remapped vector 240-*b* with the same vector coordinates).

The remapped vectors 240 may be sent to one or more scoring models 245 to determine scores 250. The scoring models 245 may determine toxicity scores based on the remapped vectors 240. In some cases, the server 205 may include a separate scoring model 245 for each type of score (e.g., each text classification). For example, the server 205 may include separate scoring models 245 to determine separate hate speech scores, harassment scores, sex trafficking scores, threat scores, bullying scores, self-harm scores, or any combination of these or other focused topical classifications. In some cases, the scores 250 may be probability values indicating a likelihood that the input phrase 210 is associated with the given classification. For example, a hate speech score of 0.06 may indicate a very low probability that the corresponding phrase 210 includes hate speech, while a hate speech scores of 0.85 indicates a strong probability that the corresponding phrase 210 includes hate speech. Each remapped vector 240 may be sent to each scoring model 245 for scoring. The resulting scores 250 may be output in the probability form (e.g., as 0.85), in binary form based on a threshold (e.g., indicating whether or not the phrase 210 falls into the given text classification based on the output probability), or in some other form (e.g., with different levels of likelihood that the phrase 210 falls into a given category, such as "very likely," "likely," "unlikely," and "very unlikely" based on a set of probability thresholds). These scores 250 may be based on a greatest output node value determined for the neural network of a scoring model 245.

Each scoring model 245 may be an example of a supervised machine learning model (e.g., a CNN, an RNN, an LSTM deep learning model, etc.). For example, the hate speech scoring model may be trained on data tagged to indicate phrases in which hate speech is present, while the bullying scoring model may be trained on data tagged to indicate phrases involving bullying. The training of the scoring models 245 may be performed based on the reference language (and not all of the other languages supported by the server 205), as the scoring models 245 receive input vectors from the reference language vector space. That is, because the reference vector space is invariant to different languages, using the reference vector space allows the supervised models to remain the same for any supported language. This supports scalability to new languages, as adding support for a new language does not affect the scoring models 245. Instead, adding support for a new language may involve adding a new word embedding mechanism 215 and training the unsupervised layer 225 and the supervised layer 235 to accurately map vectors from a vector space for the new language to the reference language vector space. This may improve efficiency for a server 205 supporting a number of scoring models 245.

As illustrated, the server 205 may include two scoring models 245. In some cases, the server 205 may send particular phrases 210 to a certain subset of scoring models 245 based on some criteria (e.g., the server 205 may support more than two scoring models 245, but may send the phrases 210-a, 210-b, and 210-c to scoring models 245-a and 245-b based on identified language or flags corresponding to these phrases 210). In other cases, the server 205 may run all phrases 210 through each scoring model 245. In a first example, a first scoring model 245-a may receive the remapped vector 240-a as input and may determine a corresponding score 250-a. Similarly, the scoring model 245-a may calculate a score 250-b for the remapped vector 240-b and a score 250-c for the remapped vector 240-c. These scores 250 may be output to another device or another component of the server 205 for further processing, storage, or display. Additionally or alternatively, the server 205 may determine a score 250-d for the remapped vector 240-a, a score 250-e for the remapped vector 240-b, and a score 250-f for the remapped vector 240-c based on the scoring model 245-b.

Figure 3:
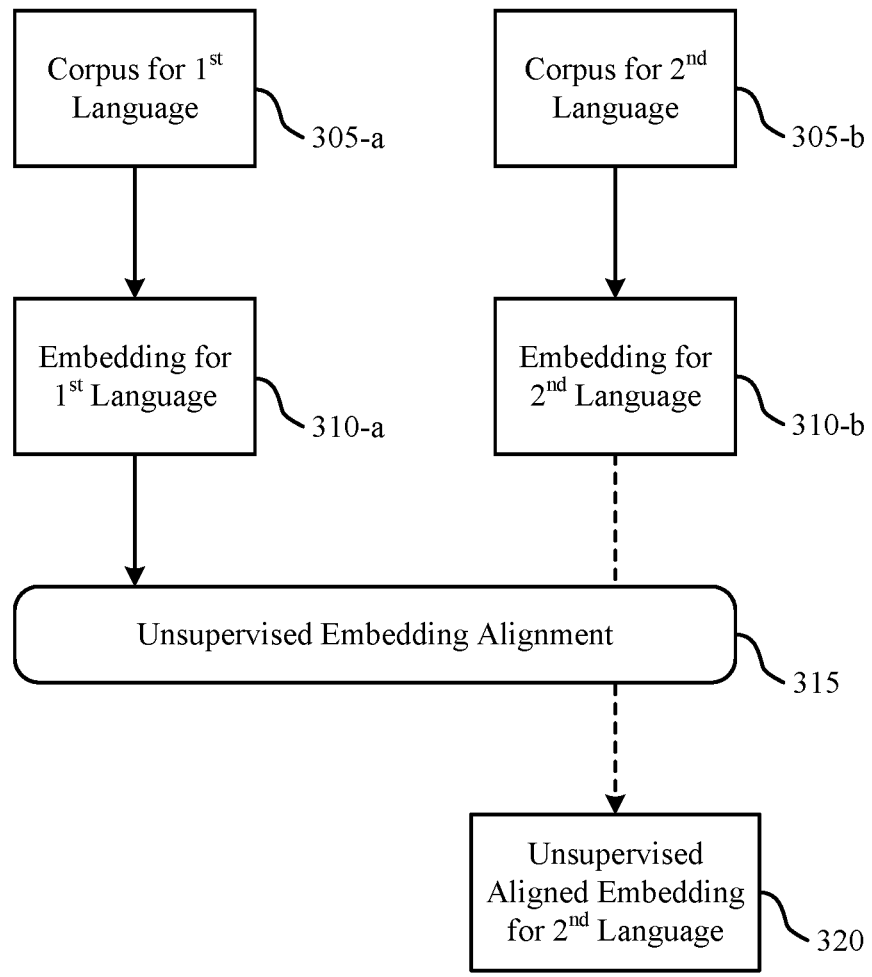
FIGS. 3 and 4 illustrate examples of architecture diagrams that support toxic vector mapping across languages in accordance with aspects of the present disclosure.

FIG. 3 illustrates an example of an architecture diagram 300 that supports toxic vector mapping across languages in accordance with aspects of the present disclosure. The architecture diagram 300 illustrates a procedure performed by a device (e.g., a server, a user device, a training module, or any other device supporting machine learning training) to train an initial vector mapping procedure. In some cases, the initial vector mapping procedure may be based on an unsupervised (or semi-supervised) embedding alignment 315. In these cases, the embedding alignment may be trained according to unlabeled input data. For example, the unsupervised embedding alignment 315 may be trained according to large corpora of texts referenced for machine learning purposes.

As illustrated, the unsupervised embedding alignment 315 may be performed to map two languages to a same vector space (i.e., embed both languages in a shared vector space). To reduce the processing involved, the system may embed one language into the vector space of the other language. This type of word embedding may be performed for any number of supported languages, where a common reference language may be used for all embeddings. For example, the architecture diagram 300 illustrates an unsupervised embedding alignment 315 into a vector space for a first language.

The system performing the machine learning may receive a corpus for the first language 305-a. This corpus for the first language 305-a may be input by a user or a system for a specific purpose or may be drawn randomly or pseudo-randomly from publicly or privately available text sources. For example, to learn an alignment focused on social media posts, the corpus may contain a large set of social media posts for training (e.g., thousands or millions of social media posts). However, for a generic language mapping procedure, the corpus may include different types of texts or information. For example, the corpus may include texts scraped from a large variety of sources, such as multilingual encyclopedia sites, social media sites, forums, news sites, or any combination of these or other general text sources. In some cases, the corpus may be provided by a second party data provider. The system may perform embedding for the first language 310-a using a word embedder specific to the first language. This word embedder may be an off-the-shelf product or may be trained by the system. The word embedder may map the words and/or phrases in the corpus for the first language 305-a into vectors of real numbers. As the unsupervised embedding alignment 315 may use the first language as the reference language, these vectors determined by the embedding for the first language 310-a may already exist in the reference language vector space.

Additionally, the system performing the machine learning may receive a corpus for a second language 305-b supported by the system. This corpus may be retrieved or generated in a similar manner to the corpus for the first language 305-a. The system may perform embedding for the second language 310-b using a word embedder specific to the second language. This word embedding may result in a second set of vectors in a vector space associated with the second language. However, this second set of vectors may not support comparison to the first set of vectors due to the different vector spaces.

To support comparison between vectors of different languages, the system may implement unsupervised embedding alignment 315. Using the unsupervised embedding alignment 315, the system may determine an operation (e.g., a linear operation) for mapping vectors from the vector space for the second language to the vector space for the first language (i.e., the reference vector space). By applying this operation to the second set of vectors, the system may determine an unsupervised aligned embedding for the second language 320 in the vector space for the first language. In this way, the system may perform analysis based on vectors in the vector space for the first language, while supporting both the first language and the second language. The system may map any number of languages to the reference vector space. While this unsupervised embedding alignment 315 may support generic language mapping, the system may send the resulting embedded vectors to a further remapping process to tune the embedding for a specific application (e.g., toxic language identification).

Figure 4:
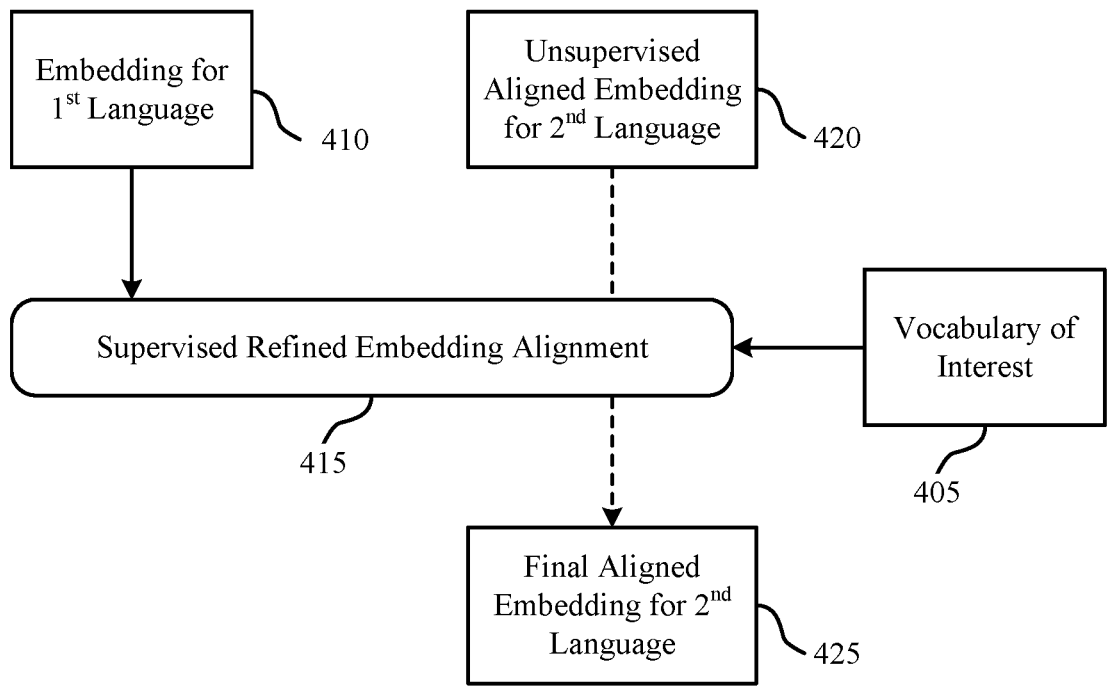

FIG. 4 illustrates an example of an architecture diagram 400 that supports toxic vector mapping across languages in accordance with aspects of the present disclosure. The architecture diagram 400 illustrates a procedure performed by a device (e.g., a server, a user device, a training module, or any other device supporting machine learning training) to train a targeted vector mapping procedure. In some cases, the vector mapping procedure may be based on a supervised (or semi-supervised) refined embedding alignment 415. In these cases, the embedding alignment may be trained according to labeled input data (e.g., a vocabulary of interest 405). In some cases, the output of the architecture diagram 300 may be received as input to the architecture diagram 400 for refined embedding. In other cases, the architecture diagrams 300 and 400 may be implemented in parallel or in some other order to determine final vector alignment in a reference language vector space.

The system performing the machine learning may perform embedding for a first language 410 (e.g., a reference language) to determine a set of vectors in a reference vector space (e.g., a vector space for the first language). The system may additionally perform unsupervised aligned embedding for a second language 420 to determine a set of vectors in the reference vector space (e.g., aligning the vectors from a vector space for the second language to a vector space for the first language). This unsupervised alignment may support a good estimate for cross-lingual mapping but may fail to accurately indicate specific contexts or meanings in the second language. To improve this mapping for a specific purpose, the system may implement supervised refined embedding alignment 415 based on a vocabulary of interest 405.

The vocabulary of interest 405 may be a set of words, phrases, or both associated with toxic language connotations and/or denotations. The vocabulary of interest 405 may be a limited set of words across multiple languages of the supported languages. For example, the vocabulary of interest 405 may include one or more words in the second language with a toxic meaning and one or more corresponding words in the first language with the same or similar toxic meaning. In some cases, words and/or phrases in the vocabulary of interest 405 may include weights (e.g., assigned by a user supervising the training), where heavier weights (i.e., higher values) correspond to words or phrases more likely to include toxic language, words or phrases with more significant toxic meanings, or some combination thereof. The assigned weights may help with the supervised refined embedding alignment 415 or with toxicity scoring.

Using the vocabulary of interest 405, the system may remap the vectors based on the unsupervised aligned embedding for the second language 420 into the reference language vector space, where the remapping prioritizes an accurate alignment of words or phrases in the vocabulary of interest 405. In this way, the final aligned embedding for the second language 425 more accurately represents the toxic language meaning in the original second language. This final aligned embedding for the second language 425 supports toxicity analysis and scoring using the final vectors in the reference language vector space. The system may remap any number of languages to the reference vector space based on the vocabulary of interest 405.

Figure 5:
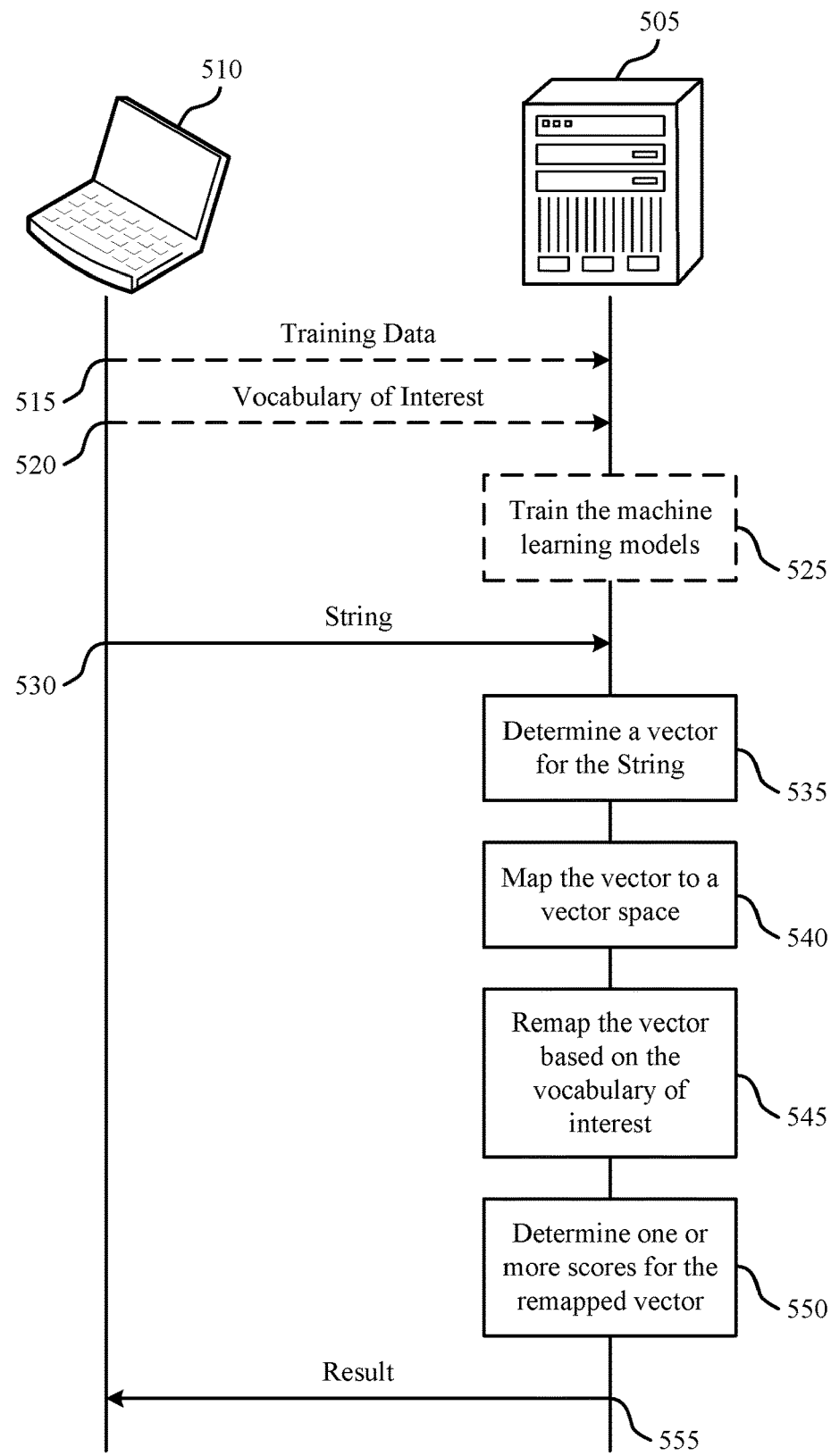
FIG. 5 illustrates an example of a process flow that supports toxic vector mapping across languages in accordance with aspects of the present disclosure.

FIG. 5 illustrates an example of a process flow 500 that supports toxic vector mapping across languages in accordance with aspects of the present disclosure. The process flow 500 may illustrate an example language mapping service for accurate cross-lingual vector alignment. The server 505 may host the language mapping procedure, and the user device 510 may communicate with the server 505 to provide training data, input phrases, or some combination thereof. The server 505 may be an example of an application server, a database server, a server cluster, a user device, a container, a virtual machine, or any combination of these or other devices or systems configured to perform toxic vector mapping across languages. In some cases, the server 505 and user device 510 may be examples of the corresponding devices described with reference to FIGS. 1 through 4. Alternative examples of the following may be implemented, where some steps are performed in a different order than described or are not performed at all. In some cases, steps may include additional features not mentioned below, or further steps may be added.

The server 505 may train one or more machine learning models on a corpus of training data. For example, at 515, the server 505 may receive training data for machine learning training (e.g., from a user device 510 or some other system). In some cases, the server 505 may train a generic vector mapping system based on this training (e.g., at 525) in order to support a set of languages. Additionally or alternatively, the server 505 may receive a vocabulary of interest at 520 for targeted vector realignment. For example, the server 505 may receive a set of words translated into the supported set of languages for focusing the language mapping and may assign a respective weight for each word in the set of words. In some cases, the assigned weights may be based on tags for the received set of words. The server 505 may determine a set of vectors for the set of words using one or more word embedding operations. At 525, the server 505 may train a targeted vector mapping system (e.g., targeted based on the vocabulary of interest for toxic vector mapping) based on the assigned weights, the determined vectors, or a combination thereof.

At 530, the server 505 may receive a String representing a phrase (e.g., a word, a set of words, a sentence, a set of sentences, etc.) in a first language supported by the language mapping service. The String may be received from the user device 510 and, in some cases, may be associated with a comment or post from a web application running on the user device 510. At 535, the server 505 may determine a vector for the String using a word embedding operation for the first language. For example, the server 505 may receive a String written in French. The server 505 may identify that the String is written in French (e.g., based on an indicator received with the String, based on an NLP process at the server 505, etc.) and may map the String to a vector in a French-specific vector space using a French-specific word embedder.

At 540, the server 505 may map the vector to a vector space associated with a reference language (e.g., if the first language is different from the reference language). For example, if the reference language for toxic vector mapping at the server 505 is English, the server 505 may map the vector from the French-specific vector space to an English-specific vector space. By mapping all supported languages to a common vector space (e.g., the reference language-specific vector space), the server 505 may support training of certain processes on the single reference language, as opposed to on each different supported language. In some examples, mapping the vector to the reference vector space may involve the server 505 applying a linear operation to the vector, where the linear operation is specific to the first language (e.g., French). The server 505 may determine this linear operation based on an unsupervised machine learning model (e.g., trained at 525).

The mapping performed at 540 may be an example of a generic initial cross-lingual vector mapping procedure. As such, the resulting vectors in the reference vector space may not accurately capture specific context or meaning in the input String (e.g., toxic language or meanings). To improve the accuracy of the language mapping for a specific purpose (e.g., toxic vector mapping), the server may remap the vector at 545. Remapping the vector may be based on a set of words (i.e., the vocabulary of interest) translated into both the first language and the reference language for focusing the language mapping. The remapped vector may align more accurately with the words and/or phrases in the vocabulary of interest.

At 550, the server 505 may determine one or more scores for the remapped vector. For example, the server 505 may determine one or more probabilities based on the remapped vector, where the one or more probabilities indicate or include scores corresponding to text classifications. These text classifications may be examples of focused topical classifications, such as toxic language classifications (e.g., hate speech, harassment, sex trafficking, threats, bullying, self-harm, etc.). In some cases, the server 505 may determine the one or more probabilities by calculating each probability using a respective supervised machine learning model. These supervised machine learning models may be examples of CNNs, RNNs, LSTM models, or some combination thereof, where the models are trained based on vectors from the reference vector space.

At 555, the server 505 may output a result based on the remapped vector. This result may indicate the one or more probabilities or scores calculated by the server 505. In some cases, the server 505 may output the result to a user device 510 for display. In other cases, the server 505 may output the result to an additional server or application for further processing or to a database for storage.

In some cases, the server 505 may update the machine learning model performing the vector remapping. For example, this machine learning model may be an example of a supervised machine learning model, such as a CNN, an RNN, an LSTM model, or any other type of machine learning model. The server 505 may receive feedback based on the output result (e.g., a user operating the user device 510 may tag the result with the correct output value) and may train the supervised machine learning model based on the tag. Additionally or alternatively, the machine learning model may be updated to handle additional vocabularies of interest, additional languages, additional scoring functions, or some combination of these. The server 505 may receive updated training data and may retrain the supervised model using an updated vocabulary of interest, a new word embedding operation for an additional supported language, a new machine learning model for scoring an input String, or any combination of these or other updated training inputs.

Figure 6:
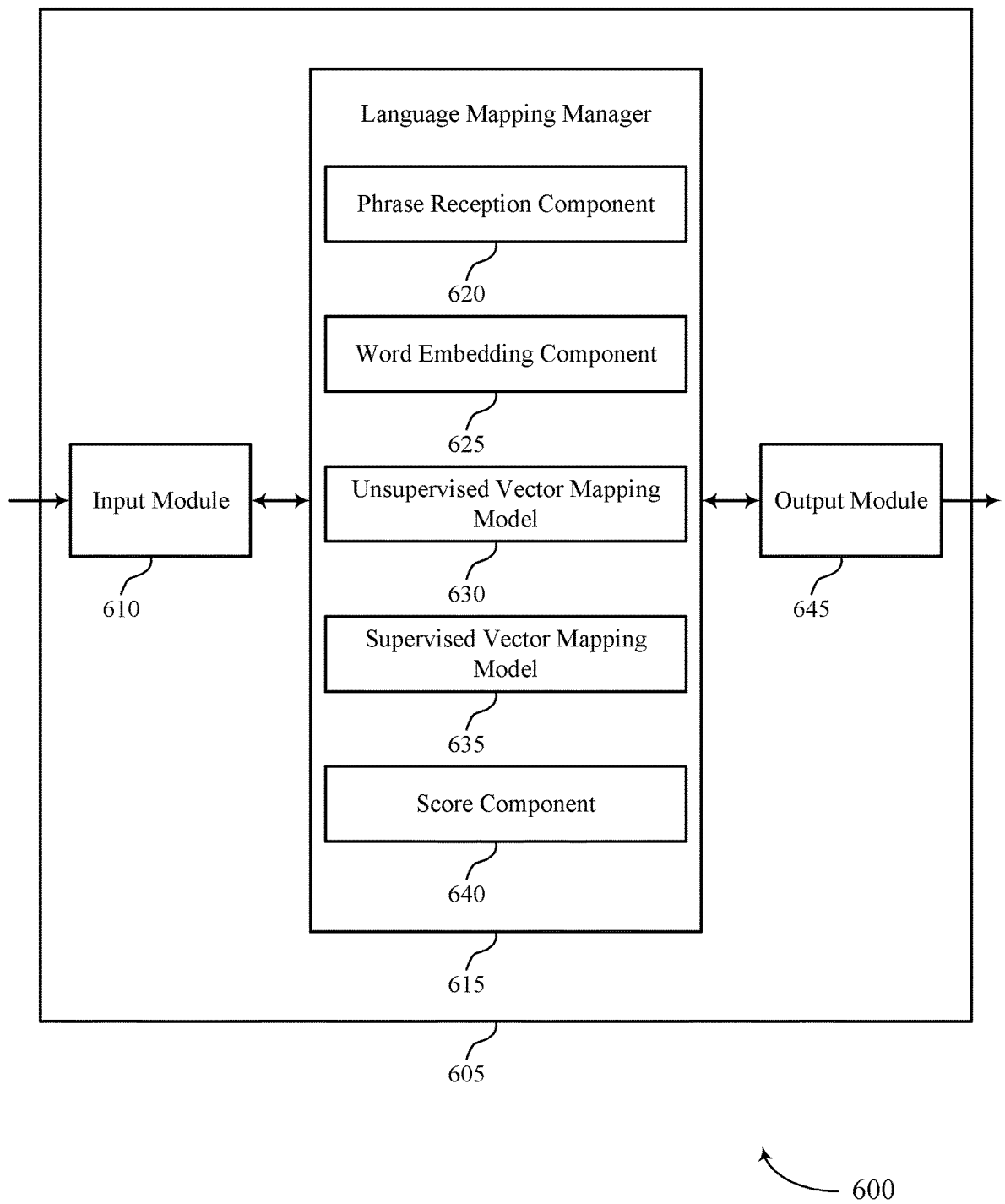
FIG. 6 shows a block diagram of an apparatus that supports toxic vector mapping across languages in accordance with aspects of the present disclosure.

FIG. 6 shows a block diagram 600 of an apparatus 605 that supports toxic vector mapping across languages in accordance with aspects of the present disclosure. The apparatus 605 may include an input module 610, a language mapping manager 615, and an output module 645. The apparatus 605 may also include a processor. Each of these components may be in communication with one another (e.g., via one or more buses). In some cases, the apparatus 605 may be an example of a user device, a server (e.g., an application server, a server cluster, etc.), or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the language mapping manager 615 to support toxic vector mapping across languages. In some cases, the input module 610 may be a component of an I/O controller 815 as described with reference to FIG. 8.

The language mapping manager 615 may include a phrase reception component 620, a word embedding component 625, an unsupervised vector mapping model 630, a supervised vector mapping model 635, and a score component 640. The language mapping manager 615 may be an example of aspects of the language mapping manager 705 or 810 described with reference to FIGS. 7 and 8.

The language mapping manager 615 and/or at least some of its various sub-components may be implemented in hardware, software executed by a processor, firmware, or any combination thereof. If implemented in software executed by a processor, the functions of the language mapping manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The language mapping manager 615 and/or at least some of its various sub-components may be physically located at various positions, including being distributed such that portions of functions are implemented at different physical locations by one or more physical devices. In some examples, the language mapping manager 615 and/or at least some of its various sub-components may be a separate and distinct component in accordance with various aspects of the present disclosure. In other examples, the language mapping manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The language mapping manager 615 may be implemented on a server. The phrase reception component 620 may receive, on the server, a string representing a phrase in a first language. In some cases, the phrase reception component 620 may be a component of an input module 610. The word embedding component 625 may determine a vector for the string using a word embedding operation for the first language. The unsupervised vector mapping model 630 may map the vector to a vector space associated with a reference language. The supervised vector mapping model 635 may remap the vector based on a set of words (e.g., a limited set of words) translated into both the first language and the reference language for focusing the language mapping. The score component 640 may output, from the server, a result based on the remapped vector. In some cases, the score component 640 may be a component of an output module 645.

The output module 645 may manage output signals for the apparatus 605. For example, the output module 645 may receive signals from other components of the apparatus 605, such as the language mapping manager 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
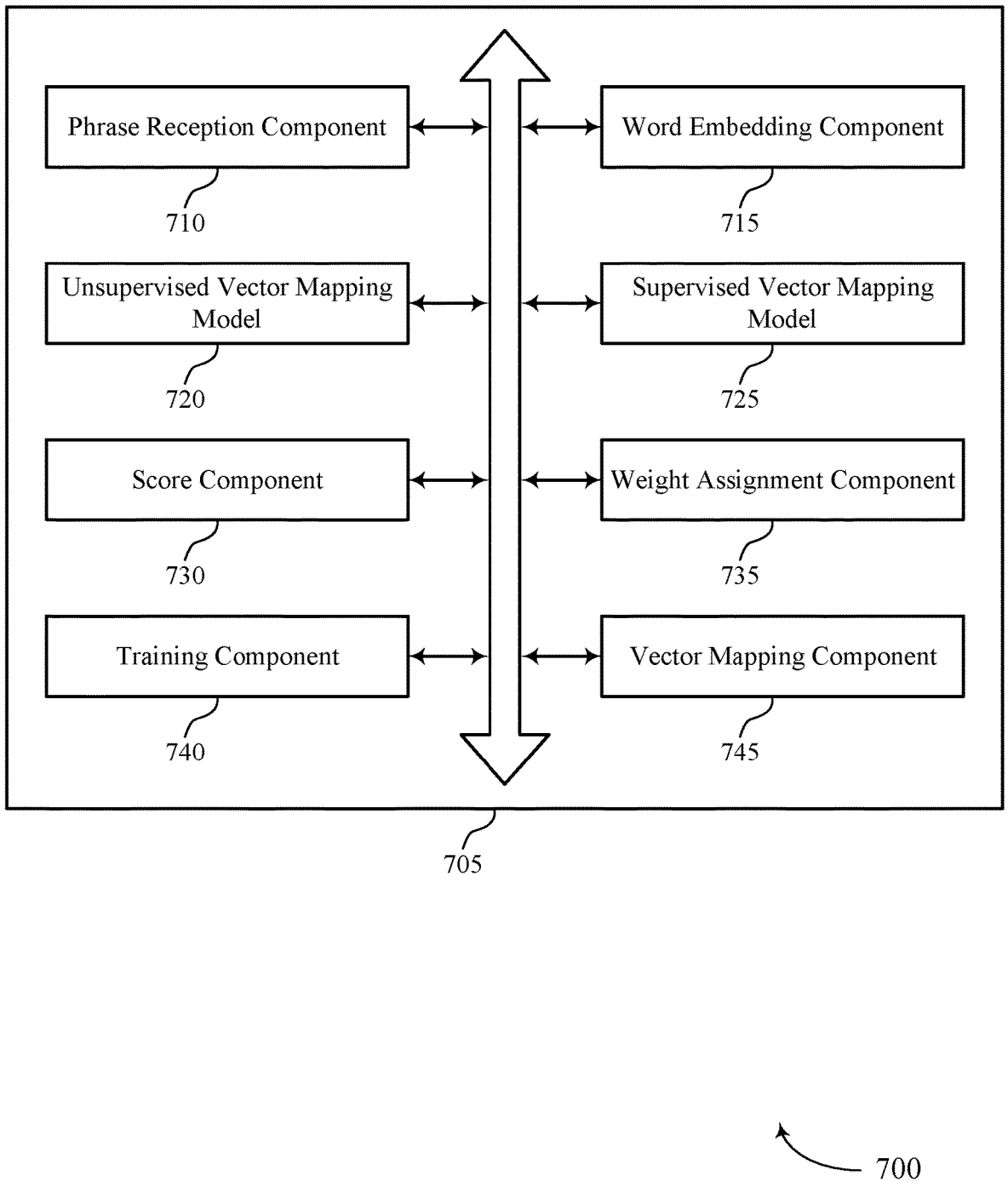
FIG. 7 shows a block diagram of a language mapping manager that supports toxic vector mapping across languages in accordance with aspects of the present disclosure.

FIG. 7 shows a block diagram 700 of a language mapping manager 705 that supports toxic vector mapping across languages in accordance with aspects of the present disclosure. The language mapping manager 705 may be an example of aspects of a language mapping manager 615 or a language mapping manager 810 described herein. The language mapping manager 705 may include a phrase reception component 710, a word embedding component 715, an unsupervised vector mapping model 720, a supervised vector mapping model 725, a score component 730, a weight assignment component 735, a training component 740, and a vector mapping component 745. Each of these modules may communicate, directly or indirectly, with one another (e.g., via one or more buses). The language mapping manager 705 may be implemented at a server (e.g., an application server, server cluster, virtual machine, etc.).

The phrase reception component 710 may receive, on the server, a string representing a phrase in a first language. The word embedding component 715 may determine a vector for the string using a word embedding operation for the first language.

The unsupervised vector mapping model 720 may map the vector to a vector space associated with a reference language. The supervised vector mapping model 725 may remap the vector based on a set of words translated into both the first language and the reference language for focusing the language mapping. The score component 730 may output, from the server, a result based on the remapped vector. In some examples, the score component 730 may transmit the result from the server to a user device, an additional server, or a combination thereof.

In some examples, the score component 730 may determine one or more probabilities based on the remapped vector, where the result indicates the one or more probabilities. For example, the one or more probabilities may include one or more scores corresponding to text classifications. These one or more scores corresponding to text classifications may include scores associated with focused topical classifications (e.g., hate speech, harassment, sex trafficking, threats, bullying, self-harm, etc.). In some examples, determining the one or more probabilities may involve the score component 730 calculating each probability of the one or more probabilities using a respective supervised machine learning model. In some cases, the respective supervised machine learning models include CNNs, RNNs, LSTM models, or a combination thereof.

In some examples, the phrase reception component 710 may receive, on the server, an additional string representing an additional phrase in a second language different from the first language. In some of these examples, the word embedding component 715 may determine an additional vector for the additional string using an additional word embedding operation for the second language. The unsupervised vector mapping model 720 may map the additional vector to the vector space associated with the reference language, and the supervised vector mapping model 725 may remap the additional vector based on an additional set of words translated into both the second language and the reference language for focusing the language mapping. In some examples, the score component 730 may output, from the server, an additional result based on the remapped additional vector.

The weight assignment component 735 may receive, on the server, the set of words translated into both the first language and the reference language for focusing the language mapping and may assign a respective weight for each word of the received set of words, where remapping the vector is based on the assigned weights. In some cases, the respective weights are assigned based on tags for the received set of words.

In some cases, remapping the vector may be based on a supervised machine learning model. In some of these cases, the training component 740 may receive, on the server, a tag in response to the result and may train the supervised machine learning model based on the tag. Additionally or alternatively, in some of these cases, the training component 740 may receive, on the server, an updated set of words translated into both the first language and the reference language for focusing the language mapping and may update the supervised machine learning model based on the updated set of words.

In some cases, the server may support a set of word embedding operations for a set of languages. In some of these cases, the training component 740 may identify an additional word embedding operation for an additional language distinct from the set of languages and may receive, on the server, an additional set of words translated into both the additional language and the reference language for focusing the language mapping. In some examples (e.g., if remapping the vector is based on a supervised machine learning model), the training component 740 may train the supervised machine learning model based on the additional set of words.

In some examples, the training component 740 may determine a set of vectors for the set of words translated into both the first language and the reference language for focusing the language mapping using the word embedding operation for the first language, where remapping the vector is based on the determined set of vectors.

In some cases, mapping the vector to the vector space associated with the reference language involves the vector mapping component 745 applying a linear operation to the vector, where the linear operation is specific to the first language. In some examples, the vector mapping component 745 may determine the linear operation using an unsupervised machine learning model.

Figure 8:
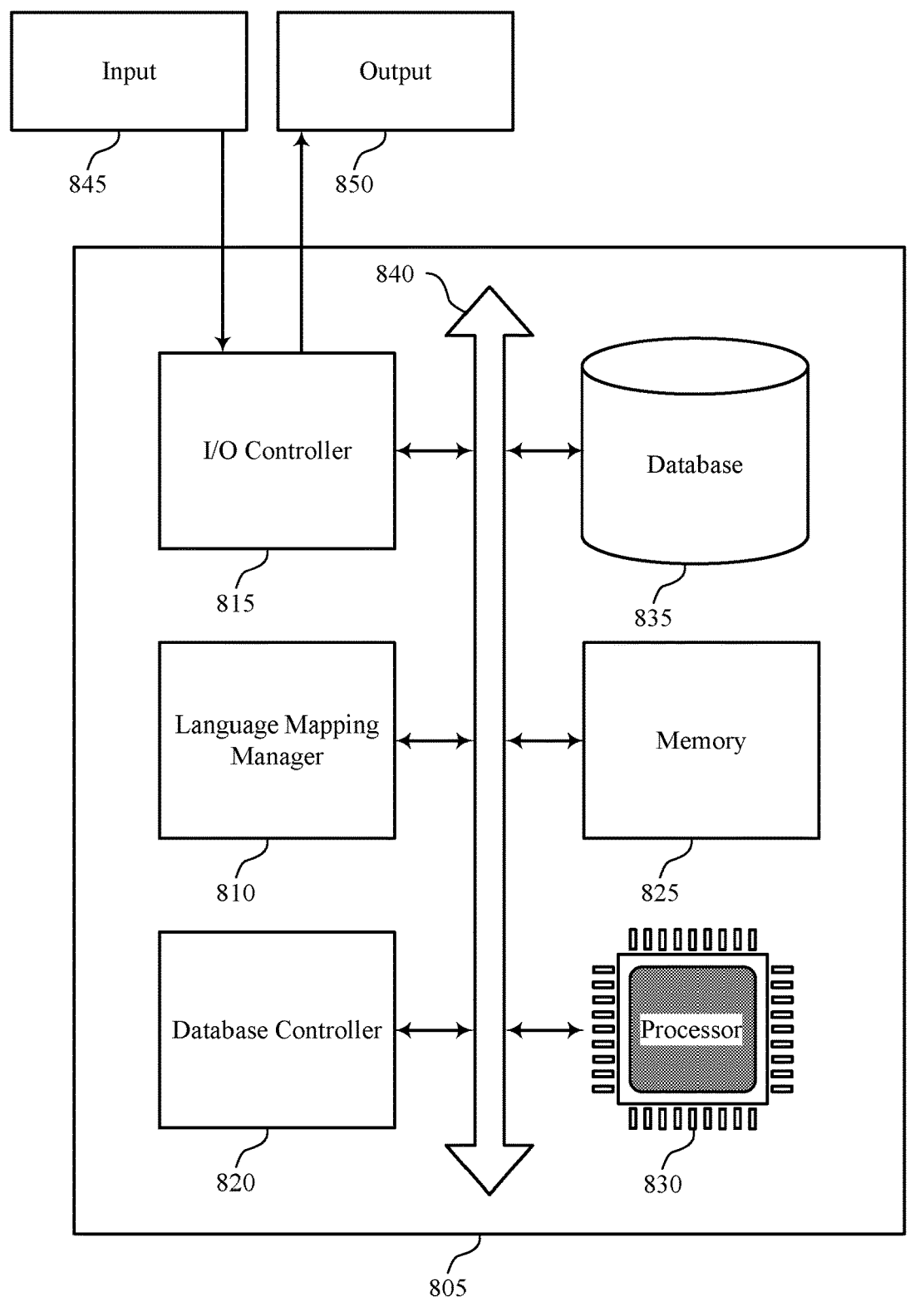
FIG. 8 shows a diagram of a system including a device that supports toxic vector mapping across languages in accordance with aspects of the present disclosure.

FIG. 8 shows a diagram of a system 800 including a device 805 that supports toxic vector mapping across languages in accordance with aspects of the present disclosure. The device 805 may be an example of or include the components of a server or an apparatus 605 as described herein. The device 805 may include components for bi-directional data communications including components for transmitting and receiving communications, including a language mapping manager 810, an I/O controller 815, a database controller 820, memory 825, a processor 830, and a database 835. These components may be in electronic communication via one or more buses (e.g., bus 840).

The language mapping manager 810 may be an example of a language mapping manager 615 or 705 as described herein. For example, the language mapping manager 810 may perform any of the methods or processes described herein with reference to FIGS. 6 and 7. In some cases, the language mapping manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting toxic vector mapping across languages).

Figure 9:
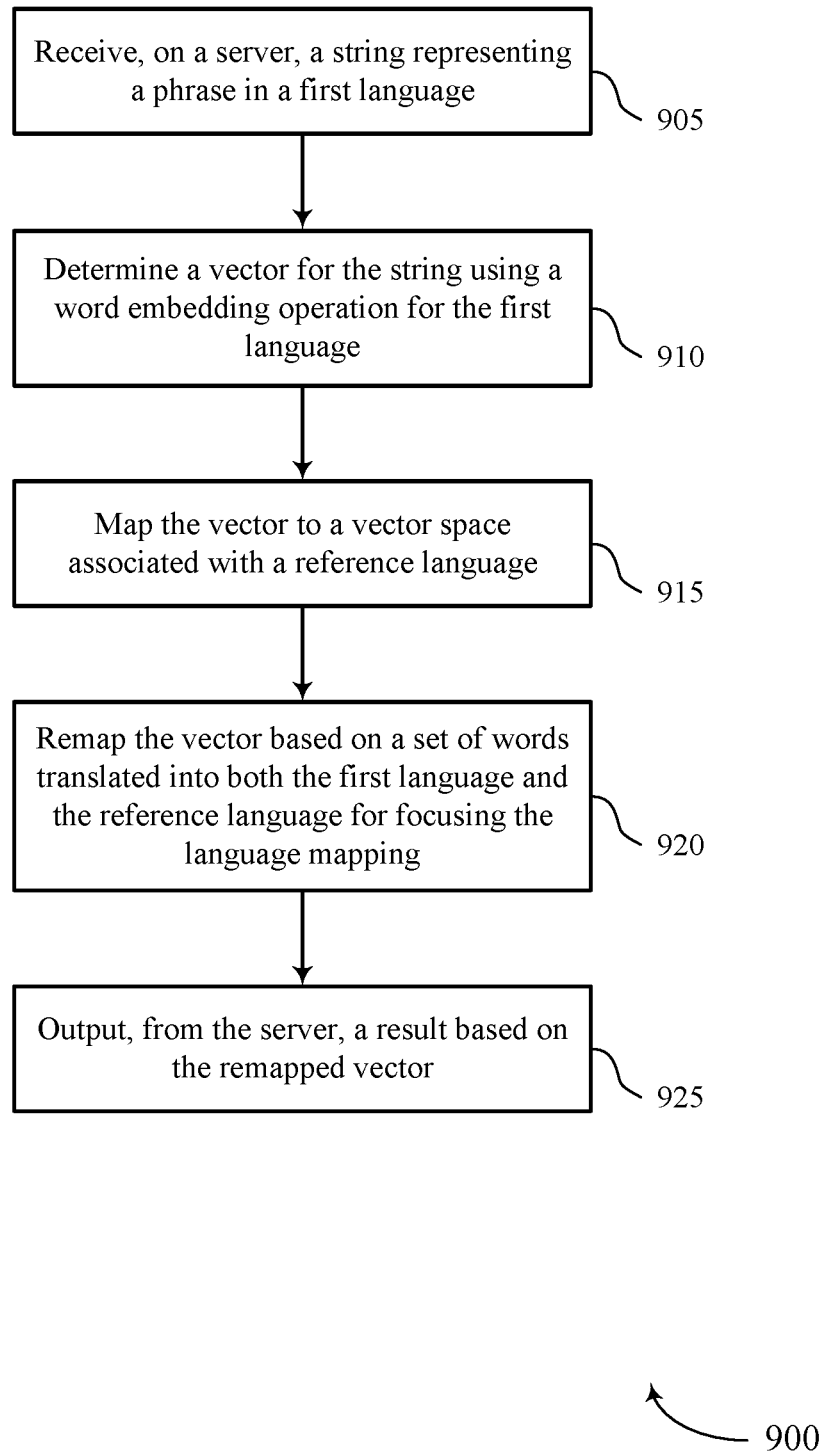
FIGS. 9 through 12 show flowcharts illustrating methods that support toxic vector mapping across languages in accordance with aspects of the present disclosure.

FIG. 9 shows a flowchart illustrating a method 900 that supports toxic vector mapping across languages in accordance with aspects of the present disclosure. The operations of method 900 may be implemented by a server or its components as described herein. For example, the operations of method 900 may be performed by a language mapping manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 905, the server may receive a string representing a phrase in a first language. The operations of 905 may be performed according to the methods described herein. In some examples, aspects of the operations of 905 may be performed by a phrase reception component as described with reference to FIGS. 6 through 8.

At 910, the server may determine a vector for the string using a word embedding operation for the first language. The operations of 910 may be performed according to the methods described herein. In some examples, aspects of the operations of 910 may be performed by a word embedding component as described with reference to FIGS. 6 through 8.

At 915, the server may map the vector to a vector space associated with a reference language. The operations of 915 may be performed according to the methods described herein. In some examples, aspects of the operations of 915 may be performed by an unsupervised vector mapping model as described with reference to FIGS. 6 through 8.

At 920, the server may remap the vector based on a set of words translated into both the first language and the reference language for focusing the language mapping. The operations of 920 may be performed according to the methods described herein. In some examples, aspects of the operations of 920 may be performed by a supervised vector mapping model as described with reference to FIGS. 6 through 8.

At 925, the server may output a result based on the remapped vector. The operations of 925 may be performed according to the methods described herein. In some examples, aspects of the operations of 925 may be performed by a score component as described with reference to FIGS. 6 through 8.

Figure 10:
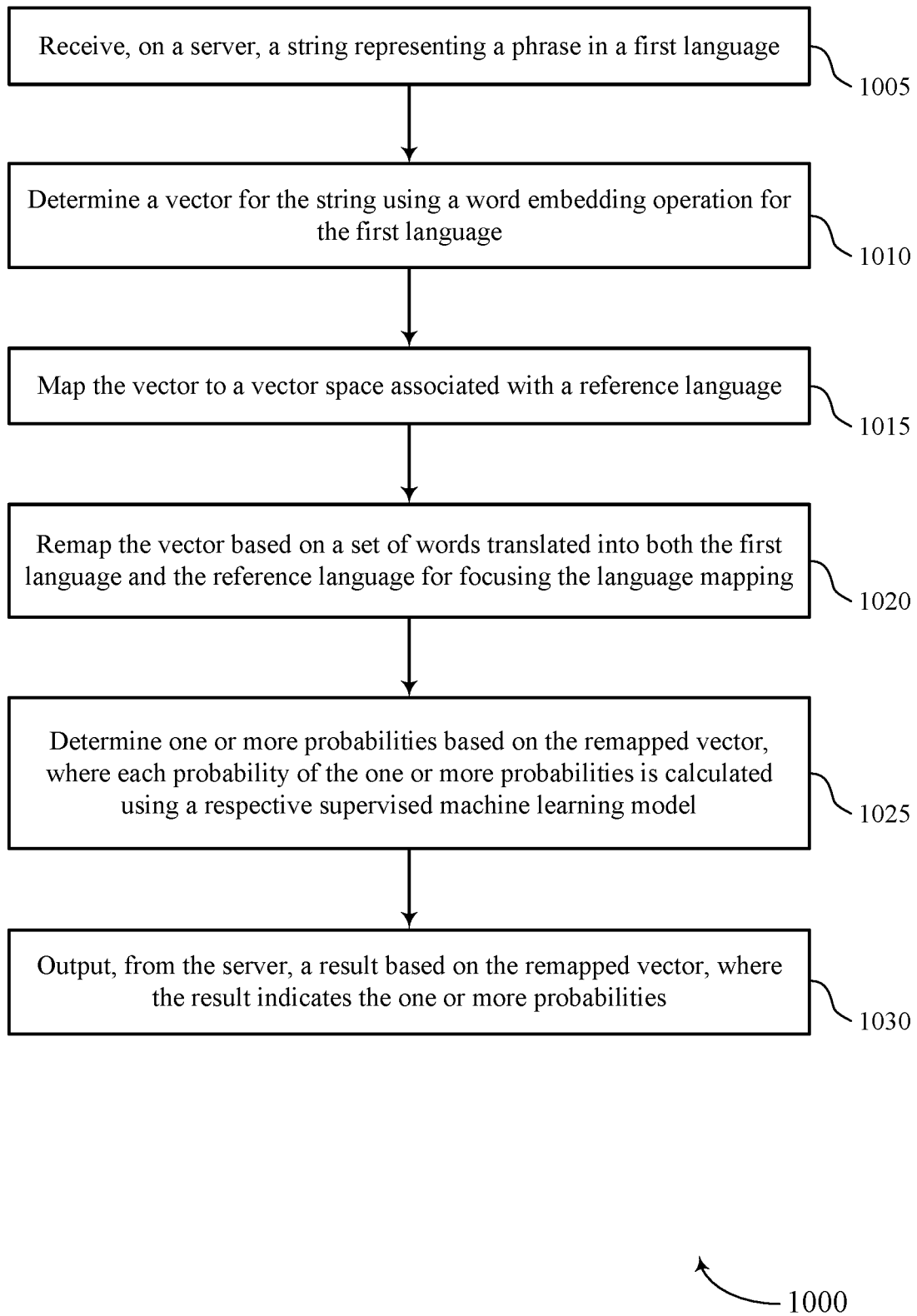

FIG. 10 shows a flowchart illustrating a method 1000 that supports toxic vector mapping across languages in accordance with aspects of the present disclosure. The operations of method 1000 may be implemented by a server or its components as described herein. For example, the operations of method 1000 may be performed by a language mapping manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1005, the server may receive a string representing a phrase in a first language. The operations of 1005 may be performed according to the methods described herein. In some examples, aspects of the operations of 1005 may be performed by a phrase reception component as described with reference to FIGS. 6 through 8.

At 1010, the server may determine a vector for the string using a word embedding operation for the first language. The operations of 1010 may be performed according to the methods described herein. In some examples, aspects of the operations of 1010 may be performed by a word embedding component as described with reference to FIGS. 6 through 8.

At 1015, the server may map the vector to a vector space associated with a reference language. The operations of 1015 may be performed according to the methods described herein. In some examples, aspects of the operations of 1015 may be performed by an unsupervised vector mapping model as described with reference to FIGS. 6 through 8.

At 1020, the server may remap the vector based on a set of words translated into both the first language and the reference language for focusing the language mapping. The operations of 1020 may be performed according to the methods described herein. In some examples, aspects of the operations of 1020 may be performed by a supervised vector mapping model as described with reference to FIGS. 6 through 8.

At 1025, the server may determine one or more probabilities based on the remapped vector. For example, the server may calculate each probability of the one or more probabilities using a respective supervised machine learning model. The operations of 1025 may be performed according to the methods described herein. In some examples, aspects of the operations of 1025 may be performed by a score component as described with reference to FIGS. 6 through 8.

At 1030, the server may output a result based on the remapped vector, where the result indicates the one or more probabilities. The operations of 1030 may be performed according to the methods described herein. In some examples, aspects of the operations of 1030 may be performed by a score component as described with reference to FIGS. 6 through 8.

Figure 11:
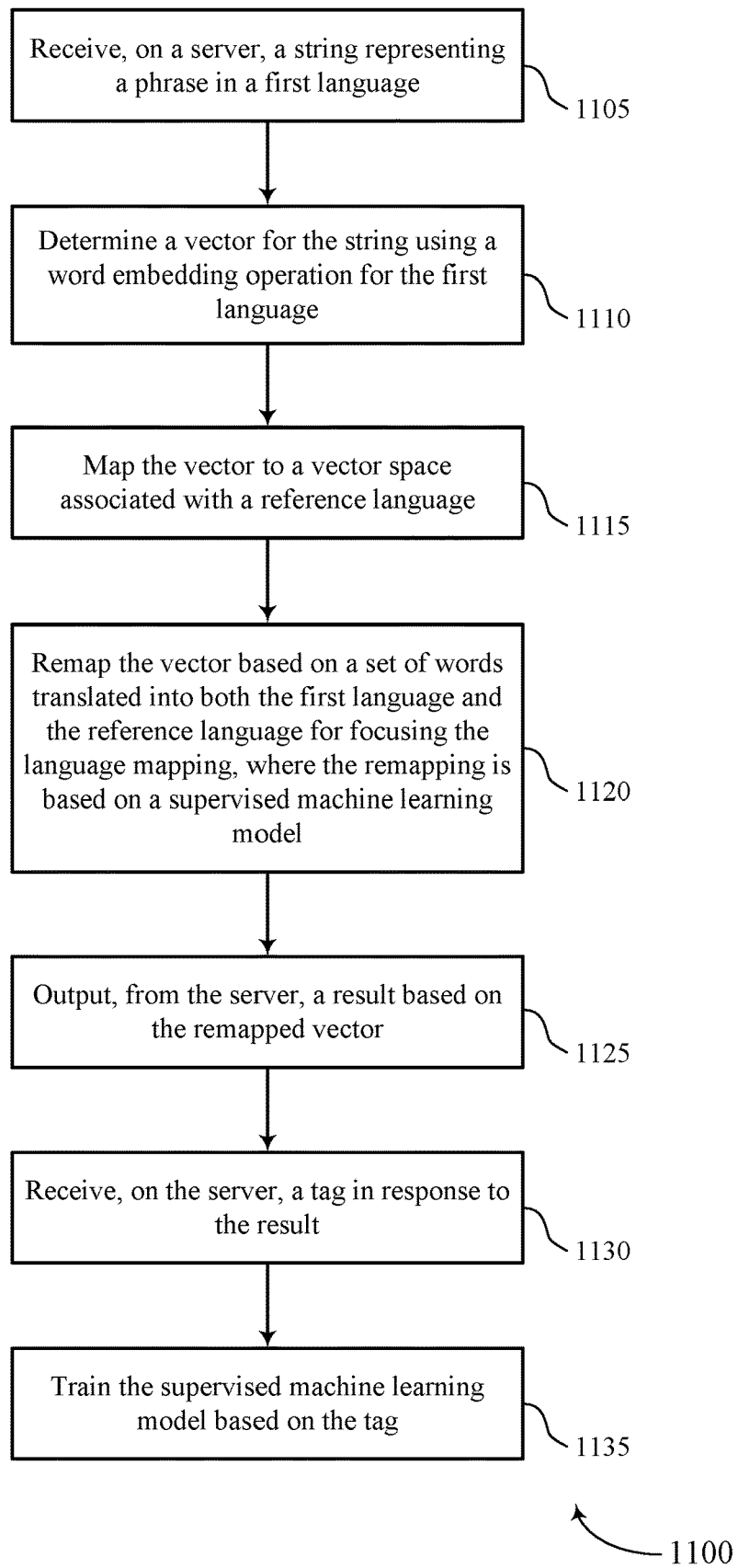

FIG. 11 shows a flowchart illustrating a method 1100 that supports toxic vector mapping across languages in accordance with aspects of the present disclosure. The operations of method 1100 may be implemented by a server or its components as described herein. For example, the operations of method 1100 may be performed by a language mapping manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1105, the server may receive a string representing a phrase in a first language. The operations of 1105 may be performed according to the methods described herein. In some examples, aspects of the operations of 1105 may be performed by a phrase reception component as described with reference to FIGS. 6 through 8.

At 1110, the server may determine a vector for the string using a word embedding operation for the first language. The operations of 1110 may be performed according to the methods described herein. In some examples, aspects of the operations of 1110 may be performed by a word embedding component as described with reference to FIGS. 6 through 8.

At 1115, the server may map the vector to a vector space associated with a reference language. The operations of 1115 may be performed according to the methods described herein. In some examples, aspects of the operations of 1115 may be performed by an unsupervised vector mapping model as described with reference to FIGS. 6 through 8.

At 1120, the server may remap the vector based on a set of words translated into both the first language and the reference language for focusing the language mapping. This remapping may be based on a supervised machine learning model. The operations of 1120 may be performed according to the methods described herein. In some examples, aspects of the operations of 1120 may be performed by a supervised vector mapping model as described with reference to FIGS. 6 through 8.

At 1125, the server may output a result based on the remapped vector. The operations of 1125 may be performed according to the methods described herein. In some examples, aspects of the operations of 1125 may be performed by a score component as described with reference to FIGS. 6 through 8.

At 1130, the server may receive a tag in response to the result. The operations of 1130 may be performed according to the methods described herein. In some examples, aspects of the operations of 1130 may be performed by a training component as described with reference to FIGS. 6 through 8.

At 1135, the server may train the supervised machine learning model based on the tag. The operations of 1135 may be performed according to the methods described herein. In some examples, aspects of the operations of 1135 may be performed by a training component as described with reference to FIGS. 6 through 8.

Figure 12:
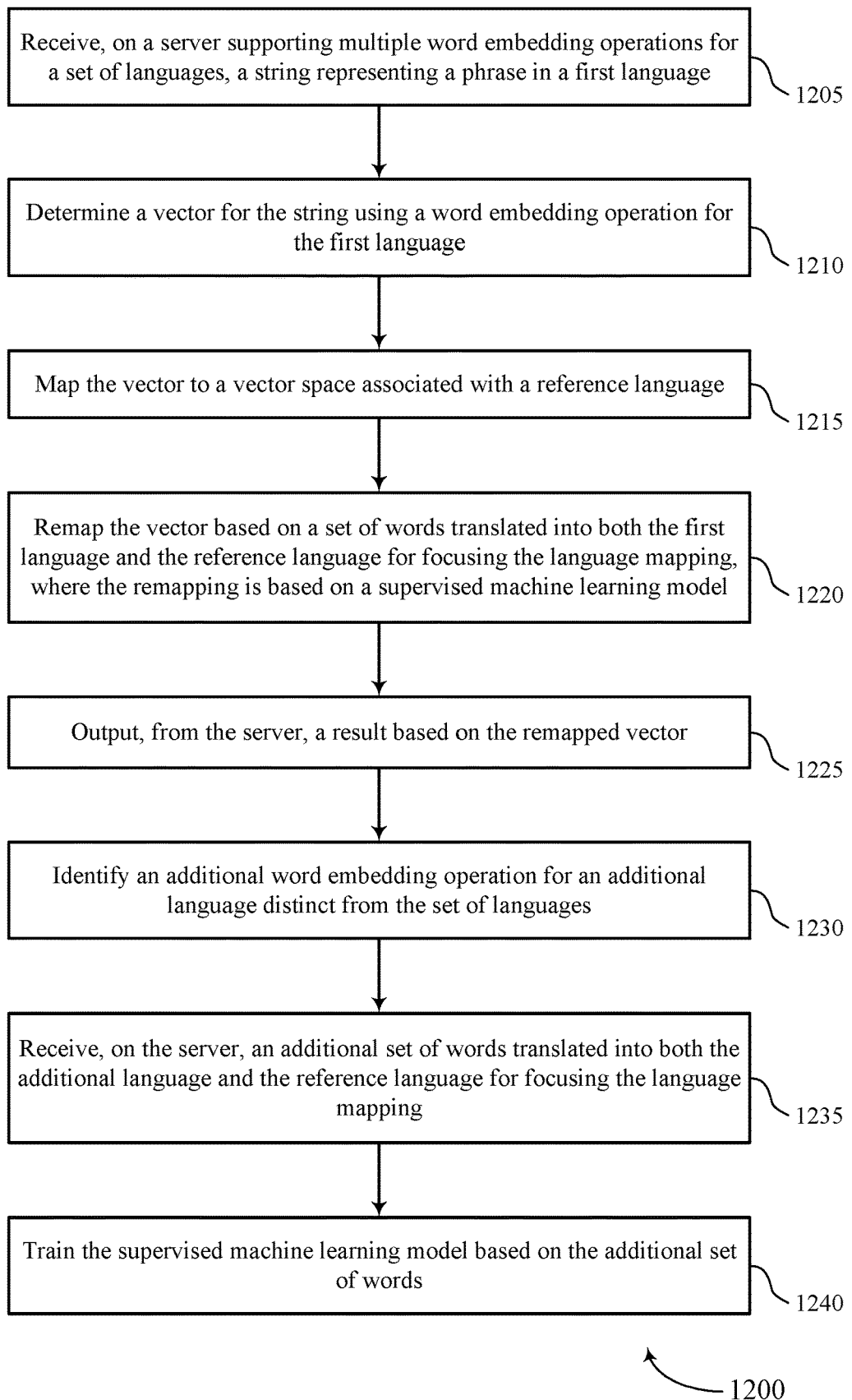

FIG. 12 shows a flowchart illustrating a method 1200 that supports toxic vector mapping across languages in accordance with aspects of the present disclosure. The operations of method 1200 may be implemented by a server or its components as described herein. For example, the operations of method 1200 may be performed by a language mapping manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1205, the server may receive a string representing a phrase in a first language. The operations of 1205 may be performed according to the methods described herein. In some examples, aspects of the operations of 1205 may be performed by a phrase reception component as described with reference to FIGS. 6 through 8.

At 1210, the server may determine a vector for the string using a word embedding operation for the first language. The operations of 1210 may be performed according to the methods described herein. In some examples, aspects of the operations of 1210 may be performed by a word embedding component as described with reference to FIGS. 6 through 8.

At 1215, the server may map the vector to a vector space associated with a reference language. The operations of 1215 may be performed according to the methods described herein. In some examples, aspects of the operations of 1215 may be performed by an unsupervised vector mapping model as described with reference to FIGS. 6 through 8.

At 1220, the server may remap the vector based on a set of words translated into both the first language and the reference language for focusing the language mapping. This remapping may be performed based on a supervised machine learning model. The operations of 1220 may be performed according to the methods described herein. In some examples, aspects of the operations of 1220 may be performed by a supervised vector mapping model as described with reference to FIGS. 6 through 8.

At 1225, the server may output a result based on the remapped vector. The operations of 1225 may be performed according to the methods described herein. In some examples, aspects of the operations of 1225 may be performed by a score component as described with reference to FIGS. 6 through 8.

In some cases, the server may support a set of word embedding operations for a set of languages. At 1230, the server may identify an additional word embedding operation for an additional language distinct from the set of languages. The operations of 1230 may be performed according to the methods described herein. In some examples, aspects of the operations of 1230 may be performed by a training component as described with reference to FIGS. 6 through 8.

At 1235, the server may receive an additional set of words translated into both the additional language and the reference language for focusing the language mapping. The operations of 1235 may be performed according to the methods described herein. In some examples, aspects of the operations of 1235 may be performed by a training component as described with reference to FIGS. 6 through 8.

At 1240, the server may train the supervised machine learning model based on the additional set of words. The operations of 1240 may be performed according to the methods described herein. In some examples, aspects of the operations of 1240 may be performed by a training component as described with reference to FIGS. 6 through 8.

A method for language mapping on a server is described. The method may include receiving, on the server, a string representing a phrase in a first language, determining a vector for the string using a word embedding operation for the first language, mapping the vector to a vector space associated with a reference language, remapping the vector based on a set of words translated into both the first language and the reference language for focusing the language mapping, and outputting, from the server, a result based on the remapped vector.

An apparatus for language mapping on a server is described. The apparatus may include a processor, memory coupled with the processor, and instructions stored in the memory. The instructions may be executable by the processor to cause the apparatus to receive, on the server, a string representing a phrase in a first language, determine a vector for the string using a word embedding operation for the first language, map the vector to a vector space associated with a reference language, remap the vector based on a set of words translated into both the first language and the reference language for focusing the language mapping, and output, from the server, a result based on the remapped vector.

Another apparatus for language mapping on a server is described. The apparatus may include means for receiving, on the server, a string representing a phrase in a first language, determining a vector for the string using a word embedding operation for the first language, mapping the vector to a vector space associated with a reference language, remapping the vector based on a set of words translated into both the first language and the reference language for focusing the language mapping, and outputting, from the server, a result based on the remapped vector.

A non-transitory computer-readable medium storing code for language mapping on a server is described. The code may include instructions executable by a processor to receive, on the server, a string representing a phrase in a first language, determine a vector for the string using a word embedding operation for the first language, map the vector to a vector space associated with a reference language, remap the vector based on a set of words translated into both the first language and the reference language for focusing the language mapping, and output, from the server, a result based on the remapped vector.

Some examples of the method, apparatuses, and non-transitory computer-readable medium described herein may further include operations, features, means, or instructions for determining one or more probabilities based on the remapped vector, where the result indicates the one or more probabilities. In some examples of the method, apparatuses, and non-transitory computer-readable medium described herein, the one or more probabilities include one or more scores corresponding to text classifications. In some examples of the method, apparatuses, and non-transitory computer-readable medium described herein, the one or more scores corresponding to text classifications include scores associated with focused topical classifications.

In some examples of the method, apparatuses, and non-transitory computer-readable medium described herein, determining the one or more probabilities may include operations, features, means, or instructions for calculating each probability of the one or more probabilities using a respective supervised machine learning model. In some examples of the method, apparatuses, and non-transitory computer-readable medium described herein, the respective supervised machine learning models include CNNs, RNNs, LSTM models, or a combination thereof.

Some examples of the method, apparatuses, and non-transitory computer-readable medium described herein may further include operations, features, means, or instructions for receiving, on the server, an additional string representing an additional phrase in a second language different from the first language, determining an additional vector for the additional string using an additional word embedding operation for the second language, mapping the additional vector to the vector space associated with the reference language, remapping the additional vector based on an additional set of words translated into both the second language and the reference language for focusing the language mapping, and outputting, from the server, an additional result based on the remapped additional vector.

Some examples of the method, apparatuses, and non-transitory computer-readable medium described herein may further include operations, features, means, or instructions for receiving, on the server, the set of words translated into both the first language and the reference language for focusing the language mapping and assigning a respective weight for each word of the received set of words, where remapping the vector may be based on the assigned weights. In some examples of the method, apparatuses, and non-transitory computer-readable medium described herein, the respective weights may be assigned based on tags for the received set of words.

In some examples of the method, apparatuses, and non-transitory computer-readable medium described herein, remapping the vector is based on a supervised machine learning model. Some of these examples of the method, apparatuses, and non-transitory computer-readable medium described herein may further include operations, features, means, or instructions for receiving, on the server, a tag in response to the result and training the supervised machine learning model based on the tag. Additionally or alternatively, some of these examples of the method, apparatuses, and non-transitory computer-readable medium described herein may further include operations, features, means, or instructions for receiving, on the server, an updated set of words translated into both the first language and the reference language for focusing the language mapping and updating the supervised machine learning model based on the updated set of words.

In some examples of the method, apparatuses, and non-transitory computer-readable medium described herein, the server supports a set of word embedding operations for a set of languages and remapping the vector is based on a supervised machine learning model. Some examples of the method, apparatuses, and non-transitory computer-readable medium described herein may further include operations, features, means, or instructions for identifying an additional word embedding operation for an additional language distinct from the set of languages, receiving, on the server, an additional set of words translated into both the additional language and the reference language for focusing the language mapping, and training the supervised machine learning model based on the additional set of words.

Some examples of the method, apparatuses, and non-transitory computer-readable medium described herein may further include operations, features, means, or instructions for determining a set of vectors for the set of words translated into both the first language and the reference language for focusing the language mapping using the word embedding operation for the first language, where remapping the vector may be based on the determined set of vectors.

In some examples of the method, apparatuses, and non-transitory computer-readable medium described herein, mapping the vector to the vector space associated with the reference language may include operations, features, means, or instructions for applying a linear operation to the vector, where the linear operation may be specific to the first language. Some examples of the method, apparatuses, and non-transitory computer-readable medium described herein may further include operations, features, means, or instructions for determining the linear operation using an unsupervised machine learning model.

In some examples of the method, apparatuses, and non-transitory computer-readable medium described herein, outputting the result may include operations, features, means, or instructions for transmitting the result from the server to a user device, an additional server, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for language mapping on a server, comprising:
   receiving, on the server, a string representing a phrase in a first language;
   determining a vector for the string using a word embedding operation for the first language;
   mapping, using an unsupervised machine learning model, the vector to a vector space associated with a reference language;
   remapping, using a supervised machine learning model, the vector to the vector space based at least in part on a set of words translated into both the first language and the reference language for focusing the mapping;
   calculating each score of one or more scores using a respective supervised machine learning model different from the supervised machine learning model used for remapping the vector; and
   outputting, from the server, a result indicating the one or more scores associated with the set of words based at least in part on the remapped vector.

2. The method of claim 1, further comprising:
   determining one or more probabilities based at least in part on the remapped vector, wherein the one or more scores correspond to the one or more probabilities.

3. The method of claim 1, wherein the one or more scores correspond to text classifications and comprise scores associated with focused topical classifications.

4. The method of claim 1, wherein the respective supervised machine learning models comprise convolutional neural networks, recursive neural networks, long short-term memory models, or a combination thereof.

5. The method of claim 1, further comprising:
   receiving, on the server, an additional string representing an additional phrase in a second language different from the first language;
   determining an additional vector for the additional string using an additional word embedding operation for the second language;
   mapping, using the unsupervised machine learning model, the additional vector to the vector space associated with the reference language;
   remapping, using the supervised machine learning model used for remapping the vector, the additional vector to the vector space based at least in part on an additional set of words translated into both the second language and the reference language for focusing the language mapping; and
   outputting, from the server, an additional result based at least in part on the remapped additional vector.

6. The method of claim 1, further comprising:
   receiving, on the server, the set of words translated into both the first language and the reference language for focusing the language mapping; and
   assigning a respective weight for each word of the received set of words, wherein remapping the vector is based at least in part on the assigned weights.

7. The method of claim 6, wherein the respective weights are assigned based at least in part on tags for the received set of words.

8. The method of claim 1, further comprising:
   receiving, on the server, a tag in response to the result; and
   training the supervised machine learning model used for remapping the vector based at least in part on the tag.

9. The method of claim 1, further comprising:
   receiving, on the server, an updated set of words translated into both the first language and the reference language for focusing the language mapping; and
   updating the supervised machine learning model used for remapping the vector based at least in part on the updated set of words.

10. The method of claim 1, wherein the server supports a plurality of word embedding operations for a plurality of the method further comprising:
    identifying an additional word embedding operation for an additional language distinct from the plurality of languages;
    receiving, on the server, an additional set of words translated into both the additional language and the reference language for focusing the language mapping; and
    training the supervised machine learning model used for remapping the vector based at least in part on the additional set of words.

11. The method of claim 1, further comprising:
    determining a set of vectors for the set of words translated into both the first language and the reference language for focusing the language mapping using the word embedding operation for the first language, wherein remapping the vector is based at least in part on the determined set of vectors.

12. The method of claim 1, wherein mapping the vector to the vector space associated with the reference language comprises:
    applying a linear operation to the vector, wherein the linear operation is specific to the first language.

13. The method of claim 12, further comprising:
    determining the linear operation using the unsupervised machine learning model.

14. The method of claim 1, wherein outputting the result comprises:
    transmitting the result from the server to a user device, an additional server, or a combination thereof.

15. The method of claim 1, wherein the set of words corresponds to a dictionary of words, phrases, or both comprising a targeted corpus of toxic words, phrases, or both.

16. An apparatus for language mapping on a server, comprising:
    a processor;
    memory coupled with the processor; and instructions stored in the memory and executable by the processor to cause the apparatus to:
- receive, on the server, a string representing a phrase in a first language;
- determine a vector for the string using a word embedding operation for the first language;
- map, using an unsupervised machine learning model, the vector to a vector space associated with a reference language;
- remap, using a supervised machine learning model, the vector to the vector space based at least in part on a set of words translated into both the first language and the reference language for focusing the mapping;
- calculate each score of one or more scores using a respective supervised machine learning model different from the supervised machine learning model used for remapping the vector; and
- output, from the server, a result indicating the one or more scores associated with the set of words based at least in part on the remapped vector.

17. The apparatus of claim 16, wherein the instructions are further executable by the processor to cause the apparatus to:
- determine one or more probabilities based at least in part on the remapped vector, wherein the one or more scores correspond to the one or more probabilities.

18. The apparatus of claim 16, wherein the instructions are further executable by the processor to cause the apparatus to:
- receive, on the server, the set of words translated into both the first language and the reference language for focusing the language mapping; and
- assign a respective weight for each word of the received set of words, wherein remapping the vector is based at least in part on the assigned weights.

19. A non-transitory computer-readable medium storing code for language mapping on a server, the code comprising instructions executable by a processor to:
- receive, on the server, a string representing a phrase in a first language;
- determine a vector for the string using a word embedding operation for the first language;
- map, using an unsupervised machine learning model, the vector to a vector space associated with a reference language;
- remap, using a supervised machine learning model, the vector to the vector space based at least in part on a set of words translated into both the first language and the reference language for focusing the mapping;
- calculate each score of one or more scores using a respective supervised machine learning model different from the supervised machine learning model used for remapping the vector; and
- output, from the server, a result indicating the one or more scores associated with the set of words based at least in part on the remapped vector.

* * * * *